(12) United States Patent
Sebö

(10) Patent No.: US 8,627,788 B2
(45) Date of Patent: Jan. 14, 2014

(54) DOG HARNESS EQUIPPED WITH A COVERING COVER

(71) Applicant: Gyula Sebö, Szigetszentmilklós (HU)

(72) Inventor: Gyula Sebö, Szigetszentmilklós (HU)

(*) Notice: Subject to any disclaimer, the term of this patent is extended or adjusted under 35 U.S.C. 154(b) by 0 days.

(21) Appl. No.: 13/908,895

(22) Filed: Jun. 3, 2013

(65) Prior Publication Data
US 2013/0327282 A1 Dec. 12, 2013

(30) Foreign Application Priority Data
Jun. 11, 2012 (HU) ........................................... 00125 U

(51) Int. Cl.
*A01K 29/00* (2006.01)

(52) U.S. Cl.
USPC .............................. 119/850; 119/792; 54/79.2

(58) Field of Classification Search
USPC .......... 119/850, 792, 793, 794; 54/38.1, 44.1, 54/66, 79.1, 41.1, 44.5, 79.2, 79.3, 79.4
See application file for complete search history.

(56) References Cited

U.S. PATENT DOCUMENTS

| | | | | |
|---|---|---|---|---|
| 5,237,448 A * | 8/1993 | Spencer et al. | ............... | 119/792 |
| 5,970,921 A * | 10/1999 | Fulton | ........................... | 119/858 |
| 5,996,537 A * | 12/1999 | Caditz | ........................... | 119/850 |
| 6,009,693 A * | 1/2000 | Hsi-Chang | ..................... | 54/79.1 |
| 6,484,480 B2 * | 11/2002 | Rauch | ............................. | 54/66 |
| 6,571,745 B2 * | 6/2003 | Kerrigan | ........................ | 119/858 |
| 7,243,485 B2 * | 7/2007 | Donahue | ........................ | 54/79.4 |
| 7,281,363 B2 * | 10/2007 | Woerner | ........................ | 54/37.1 |
| 7,343,881 B2 * | 3/2008 | Schantz et al. | ................ | 119/792 |
| 7,618,390 B2 * | 11/2009 | Kilbey | ............................. | 602/75 |
| 7,793,619 B2 * | 9/2010 | Kajanoff | ........................ | 119/850 |
| 8,210,131 B2 * | 7/2012 | Friedland | ...................... | 119/850 |

FOREIGN PATENT DOCUMENTS

| | | | |
|---|---|---|---|
| HU | | 3972 U | 7/2011 |
| HU | | 4055 U | 1/2012 |

* cited by examiner

*Primary Examiner* — Yvonne Abbott
(74) *Attorney, Agent, or Firm* — Jason D. Voight

(57) ABSTRACT

The invention relates to a dog harness equipped with a covering cover comprising a blanketing saddle part covered by a covering cover, within that a middle portion hollow on one side and domed on the other side, and two side portions, on which side portions a chest strap is attached to trace straps, connecting the two side portions at the height of the trace straps, furthermore a back strap crossing the trace straps is attached directly to the covering cover in the continuation of a belly strap, wherein the covering cover (8) consists of at least two pieces, covering sheet-A (9) and covering sheet-B (10), connected to each other in a connection strip portion (11), furthermore at least two through openings (14) are made in the covering cover (8).

8 Claims, 3 Drawing Sheets

DOG HARNESS EQUIPPED WITH A COVERING COVER

This application claims priority to Hungarian Application No. U1200125, filed Jun. 11, 2012, the disclosure of which is hereby incorporated by reference herein.

OBJECT OF THE INVENTION

The object of the invention is a dog harness equipped with a covering cover, flaring out at the side portions, hollow on one side of the middle portion and domed on the other side, wherein the surface-forming covering cover consists of at least two pieces connected to each other, allowing the proper use of smaller remnant bits of the material and the combination of colours in the covering cover as well, furthermore by varying the strength of the covering cover pieces the side portions or the middle portion of the blanketing saddle part can be properly reinforced according to load. Furthermore, the invention relates to leading the back strap and/or the trace straps through openings under the covering cover.

BACKGROUND OF THE INVENTION

Service dogs in law enforcement, reconnaissance, and in emergency situations as search dogs, and pets in skill sports, traffic, and in case of wandering away are exposed to increased danger. The dog harness according to the invention helps in their identification and monitoring, makes it significantly easier, if the colour combination of the covering cover is designed in compliance with the high visibility standards. In the case of pulling harnesses it is necessary to reinforce the attachment points of the straps on the blanketing saddle part in order to prevent the deformation of the harnesses. The covering cover has a major effect on the form retention of the blanketing saddle part.

The known dog harnesses are of the classic so called chest strap type, wherein there is a flat strap on the chest above the front legs of the animal, which continues toward the rear along the two sides of the dog in horizontally arranged trace strap portions, side portions. On the side portions of the harness (on the sides of the dog) the trace straps are connected to a back strap, which continues downwards on both sides in a strap holding the body, that is a belly strap. The back strap is the strap in the direction of the ring for attaching a leash, between the trace straps on both sides in the continuation of the chest strap. The back strap and in its continuation the belly strap, preferably made of one piece, are equipped with buckles, strap adjusters. The straps are leather bands, cotton or synthetic woven flat ropes of the same or different width, padded in places. In certain versions a blanketing saddle part covering the back and sides of the dog is fixed under the back strap and the trace straps.

The solutions known in the prior art follow the design outlined above. A solution close to this invention is disclosed in Utility Model No. HU U11 00082.

The essence of the utility model according to the prior art is that on the side of the blanketing saddle part connecting to the back strap, on the covering cover, on the whole surface thereof, a phosphorescent layer is fixed on the blanket in an unreleasable manner, covered partially by at least two straps. Preferably the phosphorescent layer fixed on the blanket is merged with the covering of the blanket. Fluorescent pigment is applied to the phosphorescent covering of the blanket, which helps in achieving the desired colour effect.

The strength of the covering cover is not affected by the development disclosed in the said utility model. The covering cover is made of one piece, the high visibility is provided by a phosphorescent layer of uniform colour. The abrasion resistance of the layer is questionable, and its implementation requires an extremely sensitive technology.

The solution closest to this invention is disclosed in Utility Model No. HU U11 00198. A dog harness is disclosed, wherein the covering sheet (cover) consists of more than one pieces connected to each other, most preferably by sewing. However, the covering cover does not have through openings, through which the straps can be led under the covering cover.

In the prior art there is no solution that achieves the set objective, that is making the covering cover from pieces, by taking into consideration the desired colour combination, furthermore the light-absorbing ability and the stretching loads on the blanketing saddle part, in such a way that the back strap and/or trace straps resting on the saddle part are led under the covering cover through openings.

SUMMARY OF THE INVENTION

With this invention the task is to prepare a covering cover consisting of at least two pieces connected to each other, and having at least two, but most preferably 2-5 through openings made in the covering cover, through which the back strap in the continuation of the belly strap and/or the trace straps in the continuation of the chest strap are led under the covering cover.

Thus invention relates to a dog harness equipped with a covering cover comprising a blanketing saddle part covered by a covering cover, within that a middle portion hollow on one side and domed on the other side, and two side portions, on which side portions a chest strap is attached to trace straps, connecting the two side portions at the height of the trace straps, furthermore a back strap crossing the trace straps is attached directly to the covering cover in the continuation of a belly strap.

The essence of the development is that the covering cover consists of at least two pieces, covering sheet-A and covering sheet-B, connected to each other in a connection strip portion, furthermore at least two through openings are made in the covering cover.

Preferably the through openings are fixed with through opening edging seams. Preferably the light-absorbing ability of covering sheet-A and covering sheet-B is different. There is a waterproof sheet under the covering cover.

DETAILED DESCRIPTION OF THE INVENTION

Figure 1:
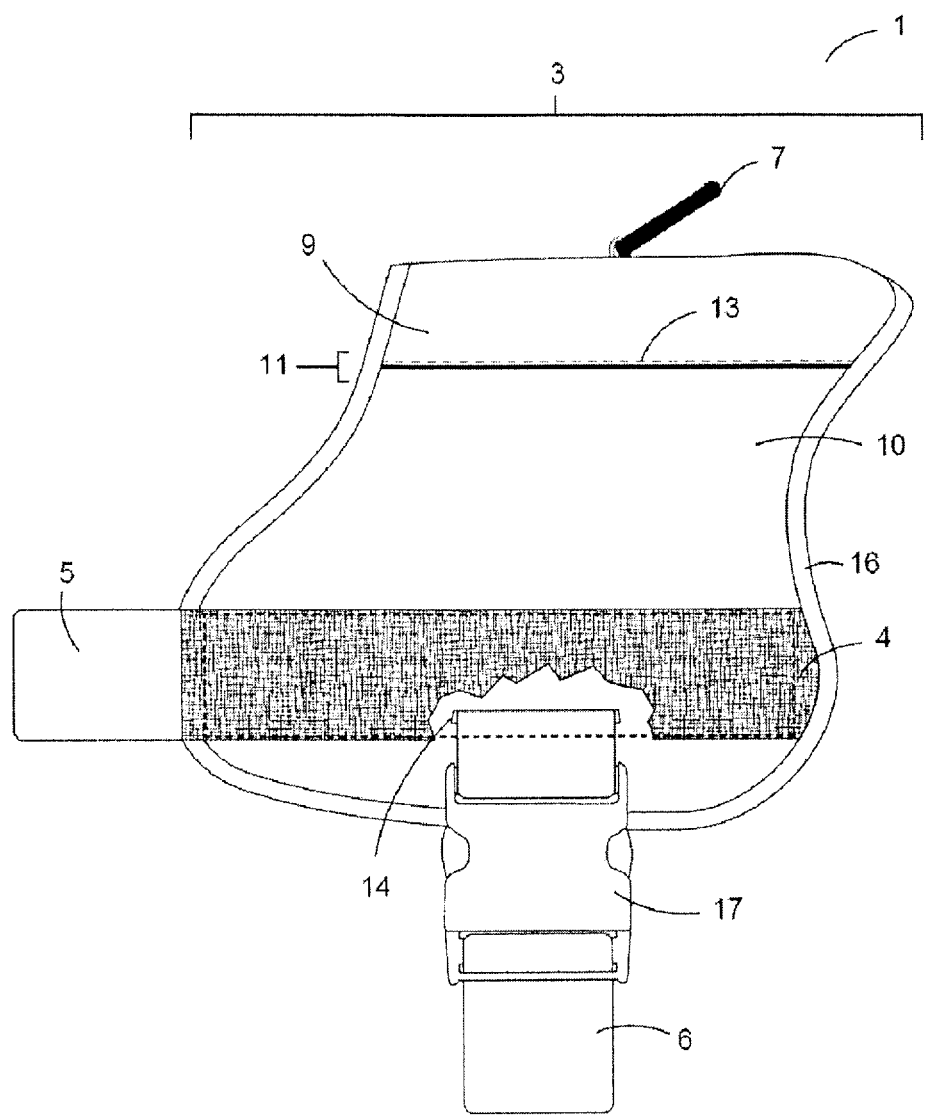
FIG. 1 shows a lateral view of the connections between the blanketing saddle part and the straps, a connection strip portion, and a through opening.
Figure 2:
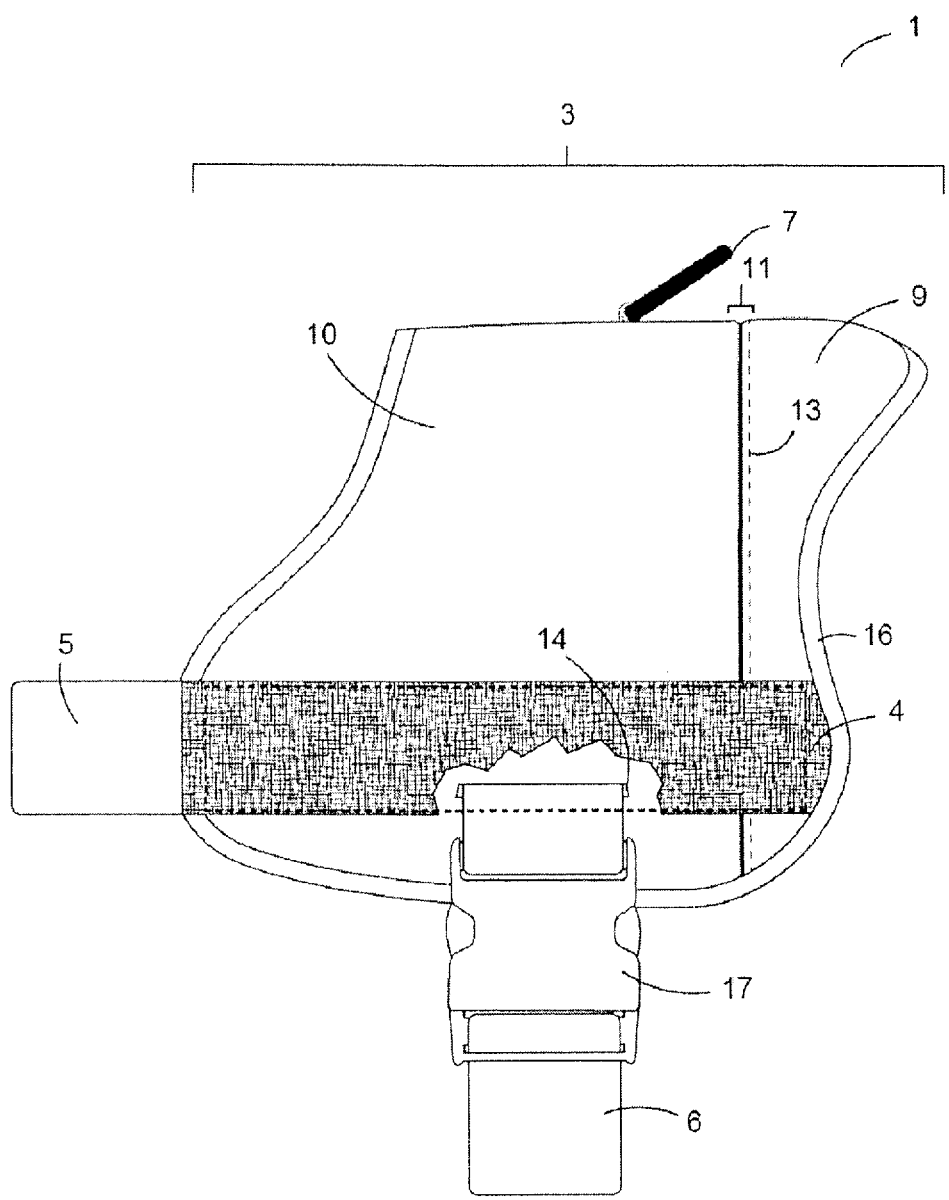
FIG. 2 shows a connection strip portion perpendicular to the trace strap, and a through opening.

FIGS. 1 and 2 show a lateral view of the dog harness equipped with a covering cover 1. It can be seen that in FIG. 1 the connection strip portion 11, fixed preferably with a connecting seam 13, is parallel with the trace straps 4 in the continuation of the chest strap 5, while in FIG. 2 it is perpendicular to the trace straps 4. There is a through opening 14 in the saddle part 3, covered by the trace strap 4 and thus shown in a sectional view, where a belly strap 6 equipped with a buckle 17 is connected, or the belly strap 6 is thereby led under the blanketing saddle part 3. The blanketing saddle part 3 is divided into covering sheet-B 10 and covering sheet-A 9 by the connection strip portion 11, and bordered by an edging strip 16. The blanketing saddle part 3 has a leash ring 7.

Figure 3:
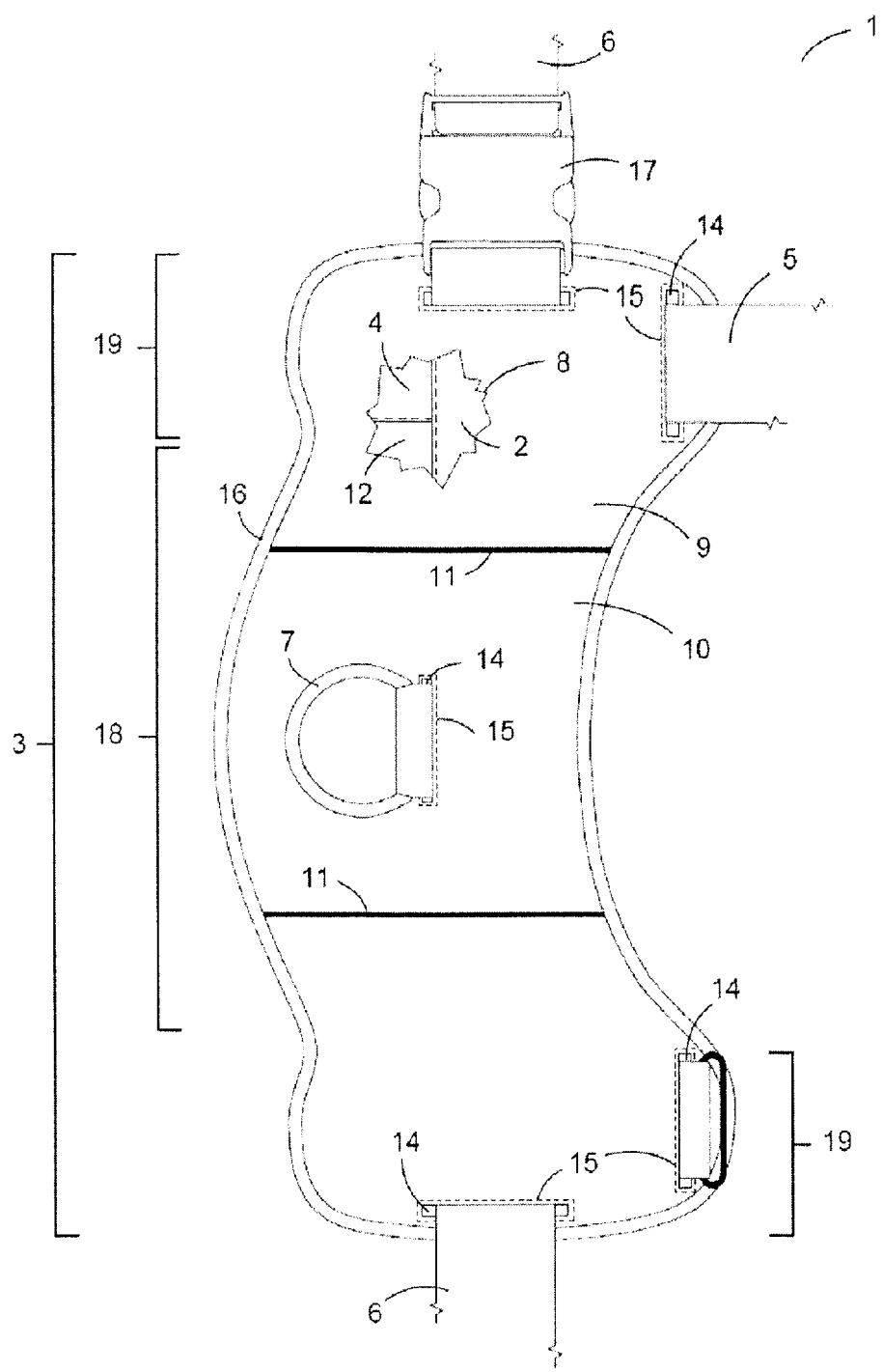
FIG. 3 shows the middle portion, side portions, connection strip portions and through openings of the blanketing saddle part in an outspread position.

FIG. 3 shows a preferred embodiment of the dog harness equipped with a covering cover 1 in an outspread position, wherein both the back strap 2 and the trace straps 4 are covered by the covering cover 8. In this case the covering cover 8 has five through openings 14, through which the back strap 2 and the trace straps 4, the chest strap 5 and the belly strap 6 are led under the covering cover 8. The leash ring 7 is also fixed through a through opening 14. The through openings 14 are fixed with through opening edging seams 15. The trace straps 4 are fixed to the blanketing saddle part 3 in the continuation of the chest strap 5, and the back strap 2 is fixed in the continuation of the belly strap 6.

Under the trace straps 4 and the back strap 2 covered by the covering cover 8 there is a waterproof layer 12, preferably a PE fabric with a PVC carrier layer.

The blanketing saddle part 3 according to the invention is divided into a saddle part middle portion 18 and two saddle part side portions 19, and bordered by an edging strip 16. The saddle part middle portion 18 is between the trace straps 4 fixed on both saddle part side portions 19, on the back line of the dog and extending to the sides of the dog, furthermore it is hollow on one side and domed on the other side. The saddle part side portions 19 cover the sides of the dog. The blanketing saddle part 3 consists of at least two pieces, covering sheet-A 9 and covering sheet-B 10. Most preferably, the blanketing saddle part 3 consists of two or three pieces and the light-absorbing ability of the used materials is different. Covering sheet-A 9 and covering sheet-B 10 are separated by a connection strip portion 11 and connected in a known manner. A buckle 17 is attached to the belly strap 6.

The dog harness equipped with a covering cover makes it possible to increase the load capacity, form retention of dog harnesses, and allows a change in the colour composition of the covering cover by connection strip portion. This provides an excellent opportunity for increasing the high visibility of the dog. Hiding the straps under the covering cover through the through openings in the covering cover makes it possible to make covering sheet-A and covering sheet-B different, and to display high visibility or graphic elements on the whole saddle part.

LIST OF REFERENCE NUMBERS

1) Dog harness equipped with a covering cover
2) Back strap
3) Blanketing saddle part
4) Trace strap
5) Chest strap
6) Belly strap
7) Leash ring
8) Covering cover
9) Covering sheet-A
10) Covering sheet-B
11) Connection strip portion
12) Waterproof layer
13) Connecting seam
14) Through opening
15) Through opening edging seam
16) Edging strip
17) Buckle
18) Saddle part middle portion
19) Saddle part side portion

The invention claimed is:

1. A dog harness equipped with a covering cover comprising a blanketing saddle part covered by a covering cover, within that a middle portion hollow on one side and domed on the other side, and two side portions, on which side portions a chest strap is attached to trace straps, connecting the two side portions at the height of the trace straps, furthermore a back strap crossing the trace straps is attached directly to the covering cover in the continuation of a belly strap, characterized in that the covering cover (8) consists of at least two pieces, covering sheet-A (9) and covering sheet-B (10), connected to each other in a connection strip portion (11), furthermore at least two through openings (14) are made in the covering cover (8).

2. The dog harness equipped with a covering cover (1) according to claim 1, characterized in that the through openings (14) are fixed with through opening edging seams (15).

3. The dog harness equipped with a covering cover (1) according to claim 2, characterized in that the light-absorbing ability of covering sheet-A (9) and covering sheet-B (10) is different.

4. The dog harness equipped with a covering cover (1) according to claim 3, characterized in that there is a waterproof sheet (12) under the covering cover (8).

5. The dog harness equipped with a covering cover (1) according to claim 2, characterized in that there is a waterproof sheet (12) under the covering cover (8).

6. The dog harness equipped with a covering cover (1) according to claim 1, characterized in that the light-absorbing ability of covering sheet-A (9) and covering sheet-B (10) is different.

7. The dog harness equipped with a covering cover (1) according to claim 6, characterized in that there is a waterproof sheet (12) under the covering cover (8).

8. The dog harness equipped with a covering cover (1) according to claim 1, characterized in that there is a waterproof sheet (12) under the covering cover (8).

* * * * *